United States Patent [19]

Suzuki

[11] Patent Number: 5,724,116
[45] Date of Patent: Mar. 3, 1998

[54] LIQUID CRYSTAL PANEL WITH MEMORY FUNCTION

[75] Inventor: Yasushi Suzuki, Sayama, Japan

[73] Assignee: Citizen Watch Co., Ltd., Tokyo, Japan

[21] Appl. No.: 468,336

[22] Filed: Jun. 6, 1995

[51] Int. Cl.$^6$ .............................. G02F 1/1337; G02F 1/13
[52] U.S. Cl. .................... 349/171; 349/130; 349/132; 349/171; 349/172; 349/174; 349/184
[58] Field of Search ........................... 359/100, 104, 359/75, 78, 76, 56; 428/1; 349/171, 172, 174, 184, 132, 130

[56] References Cited

U.S. PATENT DOCUMENTS

| | | | |
|---|---|---|---|
| 4,813,771 | 3/1989 | Handschy et al. | 350/320 |
| 4,932,758 | 6/1990 | Hanyu et al. | 350/320 |
| 5,061,045 | 10/1991 | Yoneya et al. | 359/56 |
| 5,136,408 | 8/1992 | Okada et al. | 359/56 |
| 5,151,804 | 9/1992 | Verhulst et al. | 359/56 |
| 5,200,848 | 4/1993 | Hanyu et al. | 359/100 |
| 5,422,749 | 6/1995 | Hanyu et al. | 359/100 |
| 5,426,525 | 6/1995 | Hanyu et al. | 359/100 |
| 5,464,668 | 11/1995 | Asaoka et al. | 428/473 |

OTHER PUBLICATIONS

"Director reorientation dynamics in chevron ferroelectric liquid crystal cells," J. E. Maclennan et al., Liquid Crystals, 1990, vol. 7, No. 6, pp. 787–796. no month.

"Director orientation in chevron surface-stabilized ferroelectric liquid crystal cells; Verification of orientational binding at the chevron interface using visible polarized light transmission spectroscopy," J. E. Maclennan et al., Liquid Crystals, no month 1990, vol. 7, No. 6, pp. 753–785.

"A model for the chevron structure obtained by cooling a smectic A liquid crystal in a cell of finite thickness," L. Limat et al., Liquid Crystals, no month 1993, vol. 13, No. 1, pp. 101–113.

"Anchoring Effects on the Layer Structures in Compressible Smectics," Setsuko Mukai et al., J. of The Physical Society of Japan, vol. 61, No. 5, May, 1992, pp. 1560–1564.

Primary Examiner—William L. Sikes
Assistant Examiner—Julie Ngo
Attorney, Agent, or Firm—Finnegan, Henderson, Farabow, Garrett & Dunner

[57] ABSTRACT

A liquid crystal panel has a memory function that is reliable for a long time. The panel employs a ferroelectric or antiferroelectric liquid crystal material involving at least two kinds of layer structures of minimum energy. The layer structures are defined at least by (1) a c-director parameter that is in parallel with substrates of the panel and has at least one minimal value, or (2) an a-director parameter that is orthogonal to the substrates and has at least one maximal value. Due to these layer structures, the panel is stable, resistant to mechanical and electrical stress, reliable in operation, and excellent in memory function.

8 Claims, 10 Drawing Sheets

1

LIQUID CRYSTAL PANEL WITH MEMORY FUNCTION

BACKGROUND OF THE INVENTION

1. Field of the Invention

The present invention relates to a liquid crystal panel employing a ferroelectric or antiferroelectric liquid crystal material having a memory function and fast response.

2. Description of the Related Art

A display panel employing a ferroelectric liquid crystal material, or as disclosed in Japanese Unexamined Patent Publication No. 2-173724, a three-stable-state liquid crystal material, i.e., an antiferroelectric liquid crystal material involving antiferroelectric and ferroelectric phases provides a memory function and fast response due to spontaneous polarization of molecules of the liquid crystal material. Because of these advantages, many experiments have been conducted on liquid crystal materials having SmC* layers, to fabricate practical display panels. Although each molecule of these liquid crystal materials causes spontaneous polarization, it easily forms a spiral structure with a twisted major axis to cancel the spontaneous polarization. To maintain the spontaneous polarization, an alignment process must be carried out to form an alignment-controlled layer structure.

In consideration of these matters, Clarke et al. proposed a ferroelectric liquid crystal panel. Thereafter, many energetic studies have been made of display panels of this kind. Layer structures that produce the spontaneous polarization include not only a bookshelf structure initially proposed but also a twisted structure and a chevron structure. These layer structures greatly influence the optical characteristics of the liquid crystal panels.

The bookshelf structure is formed in a liquid crystal cell under a field-induction phase-deformation mode. The bookshelf structure is difficult to form, and even if it is formed, it is unstable for use in long periods of operation. This problem prevents practical use of panels employing the ferroelectric or antiferroelectric liquid crystal material having the bookshelf structure.

The response speed of the ferroelectric or antiferroelectric liquid crystal panel is limited by the concentration of spontaneous polarization of the liquid crystal material. The ferroelectric or antiferroelectric liquid crystal material realizes a response speed 1000 times faster than that of a paraelectric liquid crystal material because the ferroelectric liquid crystal material or a ferroelectric phase of the antiferroelectric liquid crystal material linearly couples with an electric field. This fast response is mainly due to the spontaneous polarization. If the concentration of the spontaneous polarization is too high, the ferroelectric liquid crystal material causes a burning, i.e., an excessive memory effect and becomes unerasable. Under the same excessive spontaneous polarization, the antiferroelectric liquid crystal material promotes a layer deformation due to a coupling effect between interface liquid crystals and an alignment film, to easily form a bookshelf structure as well as fine focal conic structures. The fine focal conic structures remain to deteriorate the light transmittance of the panel. To avoid these problems, the concentration of the spontaneous polarization must be limited below 10 nC/cm$^2$ for the ferroelectric liquid crystal material and below 200 nC/cm$^2$ for the antiferroelectric liquid crystal material. It is necessary, therefore, to provide a technique of a well utilizing a liquid crystal material that produces a large concentration of spontaneous polarization.

The ferroelectric liquid crystal materials have a specific layer structure involving weak disruptive strength. The layer structure of Clarke et al. is vulnerable to stress. Once the layer structure is destroyed, it must be restored by keeping it at a temperature for forming SmC* layers and by cooling the same. The ferroelectric liquid crystal materials always involve this process. It is necessary, therefore, to provide a technique of forming a ferroelectric liquid crystal panel that bears a certain degree of stress.

SUMMARY OF THE INVENTION

An object of the present invention is to provide a layer structure of a ferroelectric or antiferroelectric liquid crystal material that overcomes the disadvantages of the conventional structures and secures the following:

(1) stability for a long period of operation, (2) an increased limit of concentration of spontaneous polarization of a liquid crystal material, and a fast response speed, and (3) strength against mechanical stress.

In order to accomplish the object, the present invention provides a stable layer structure such as a chevron structure in a ferroelectric or antiferroelectric liquid crystal material, to greatly improve the electro-optical characteristics, memory function, and response speed of the liquid crystal material, as well as a method of forming such a layer structure.

A first aspect of the present invention provides a panel consisting of a ferroelectric liquid crystal material held between two substrates. Each of the substrates has a surface on which an electrode film and an alignment film are laminated. The substrates are arranged such that the alignment films face each other. The ferroelectric liquid crystal material includes a mixture of at least two kinds of layer structures involving minimum energy.

A second aspect of the present invention provides a panel consisting of an antiferroelectric liquid crystal material held between two substrates. Each of the substrates has a surface on which an electrode film and an alignment film are laminated. The substrates are arranged such that the alignment films face each other. The antiferroelectric liquid crystal material has a mixture of at least two kinds of layer structures involving minimum energy.

The present invention controls the contact angle of each alignment film, to form the above layer structures.

The layer structures in the ferroelectric liquid crystal panel according to the first aspect of the present invention are stable and involve minimum energy. These layer structures are defined by director components Ay and Cz having specific values. This panel is reliable for a long period of operation. The layer structures may be chevron structures that are resistive against mechanical deformation and involve minimum energy. The panel is capable of restoring an original state even if it is deformed by force produced by an applied voltage.

The stability and restoring ability of the layer structures greatly improve the concentration of spontaneous polarization without burning, to thereby provide the panel with improved electro-optical characteristics, memory function, and fast response. Since the panel employs at least two kinds of layer structures, the panel partly responds even to an intermediate voltage between the threshold voltages of the layer structures, to thereby display gradations with good reproducibility and reliability.

The layer structures of the antiferroelectric liquid crystal panel according to the second aspect of the present invention are stable and involve minimum energy. These layer structures are defined by director components Ay and Cz having specific values. This panel is reliable for a long period of operation. The layer structures may be chevron structures that are resistive against mechanical deformation and involve minimum energy. The panel is capable of restoring an original state even if it is deformed by force produced by an applied voltage.

The stability and restoring ability of the layer structures greatly improve the concentration of spontaneous polarization without burning, to thereby provide the panel with improved electro-optical characteristics, memory function, and fast response. Since the panel employs at least two kinds of layer structures, the panel partly responds to an intermediate voltage between the threshold voltages of the layer structures, to thereby display gradations with good reproducibility and reliability.

DESCRIPTION OF THE PREFERRED EMBODIMENTS

First embodiment

Figure 1A:
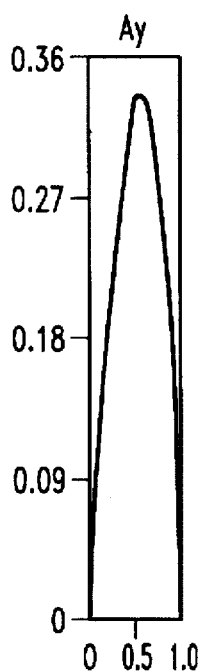
FIGS. 1(A) to 1(D) show the parameters of layer structures of a liquid crystal material according to a first embodiment of the present invention.
Figure 1B:
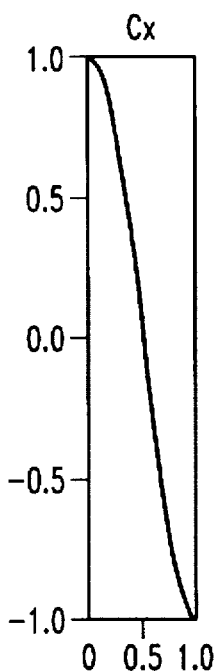
Figure 1C:
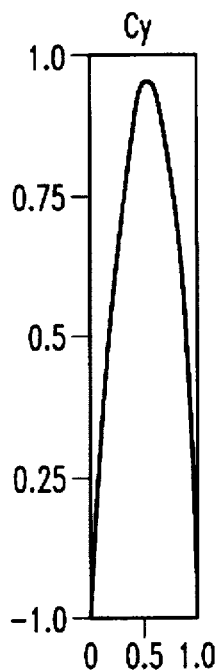
Figure 1D:
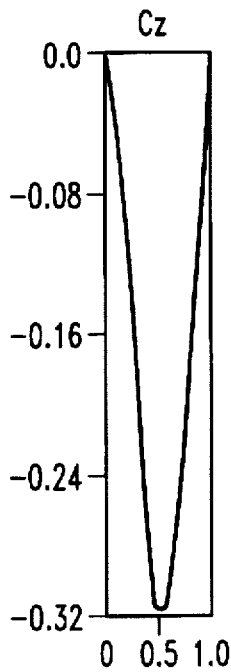
Figure 2A:
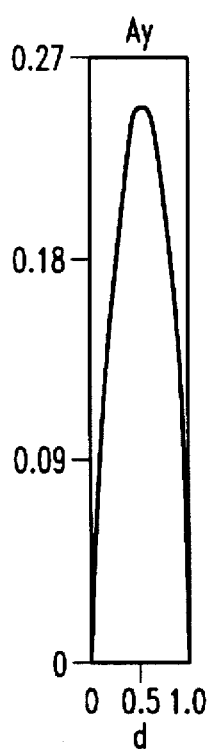
FIGS. 2(A) to 2(D) show the parameters of layer structures of a liquid crystal material according to the first embodiment.
Figure 2B:
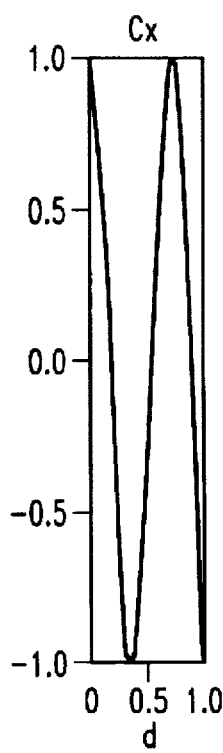
Figure 2C:
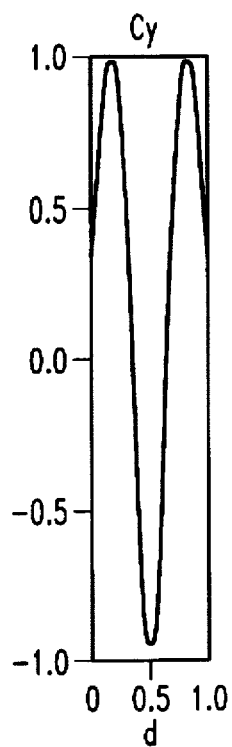
Figure 2D:
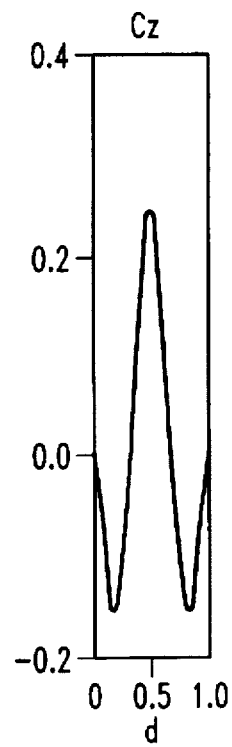
Figure 3A:
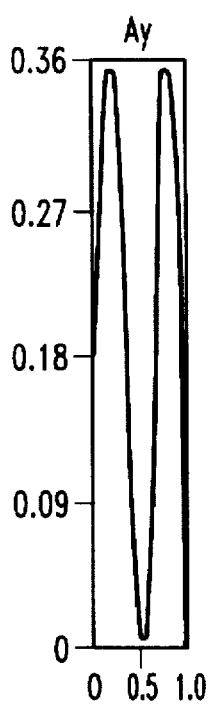
FIGS. 3(A) to 3(D) show the parameters of layer structures of a liquid crystal material according to the first embodiment.
Figure 3B:
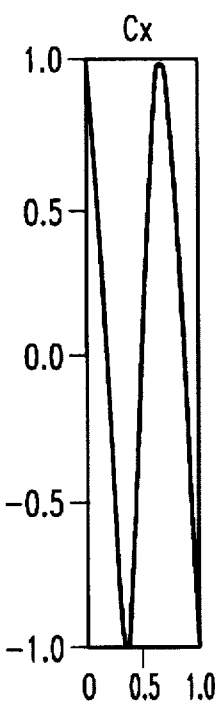
Figure 3C:
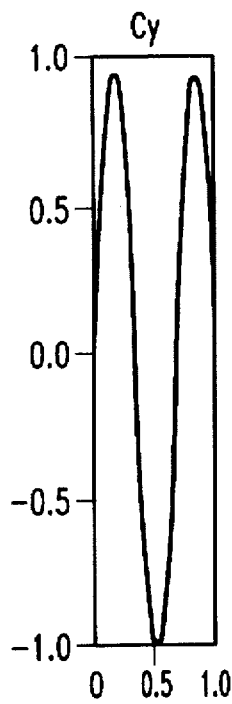
Figure 3D:
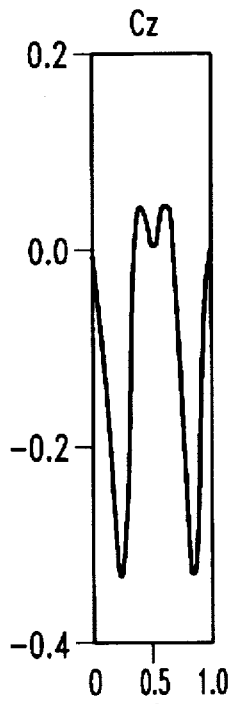
Figure 4A:
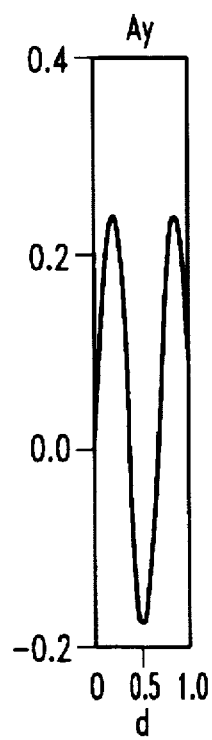
FIGS. 4(A) to 4(D) show the parameters of layer structures of a liquid crystal material according to the first embodiment.
Figure 4B:
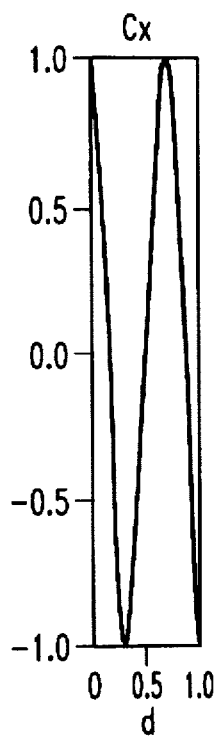
Figure 4C:
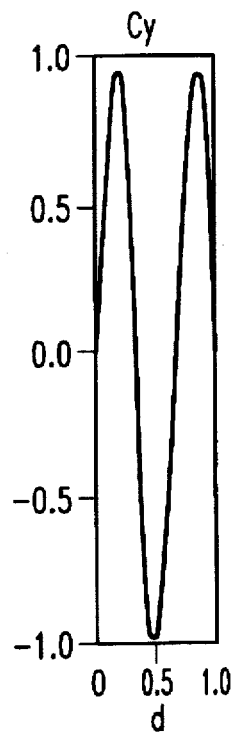
Figure 4D:
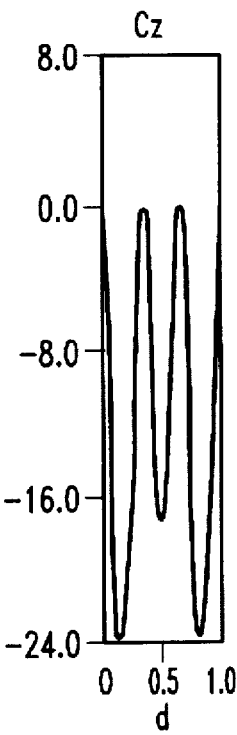
Figure 5A:
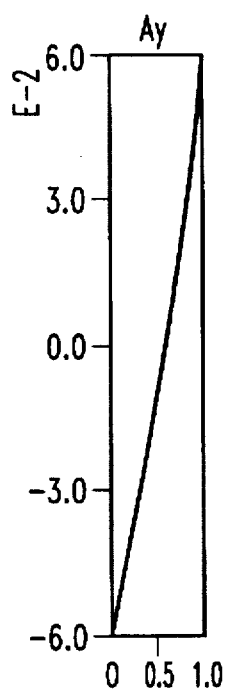
FIGS. 5(A) to 5(D) show the parameters of layer structures of a liquid crystal material according to the first embodiment.
Figure 5B:
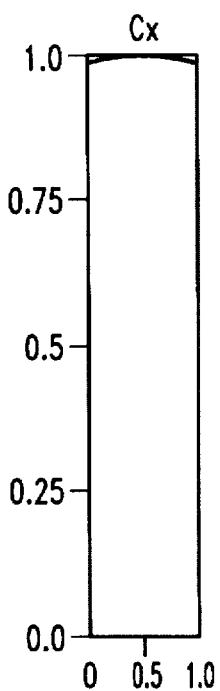
Figure 5C:
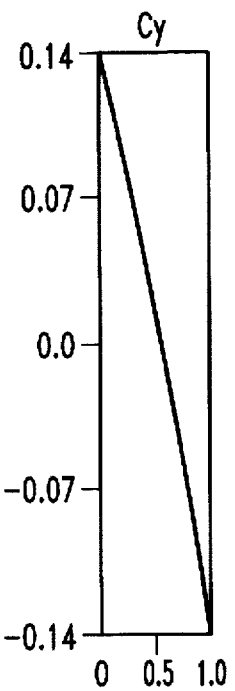
Figure 5D:
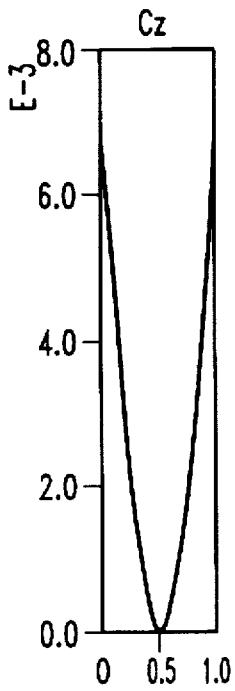
Figure 6A:
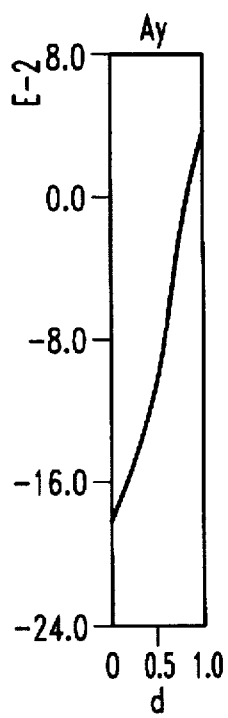
FIGS. 6(A) to 6(D) show the parameters of layer structures of a liquid crystal material according to the first embodiment.
Figure 6B:
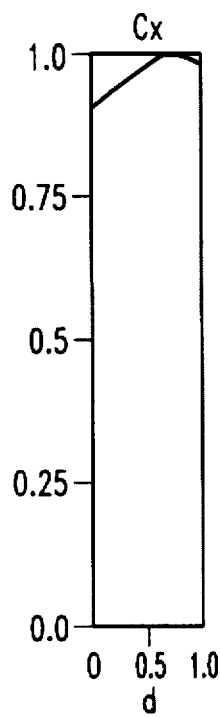
Figure 6C:
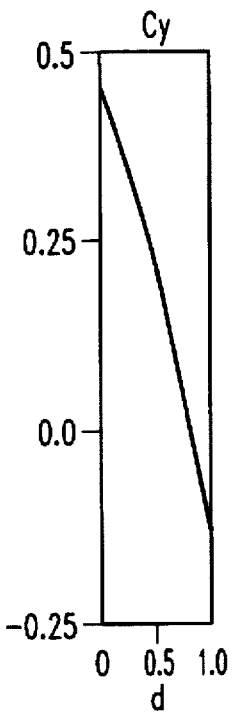
Figure 6D:
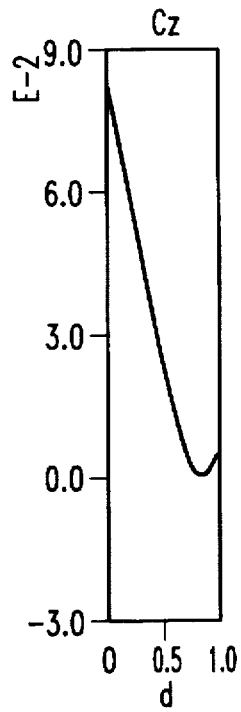
Figure 7A:
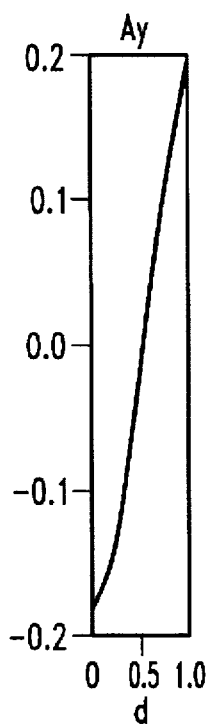
FIGS. 7(A) to 7(D) show the parameters of layer structures of a liquid crystal material according to the first embodiment.
Figure 7B:
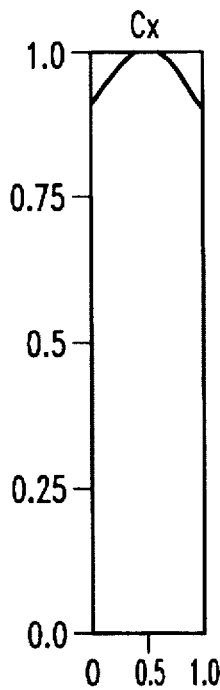
Figure 7C:
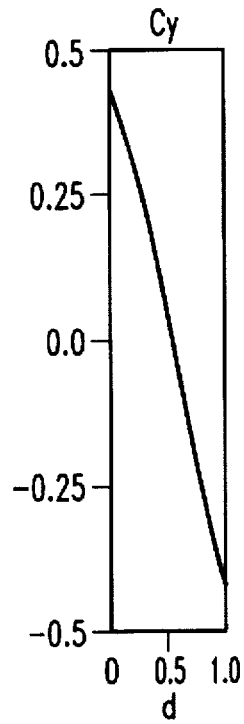
Figure 7D:
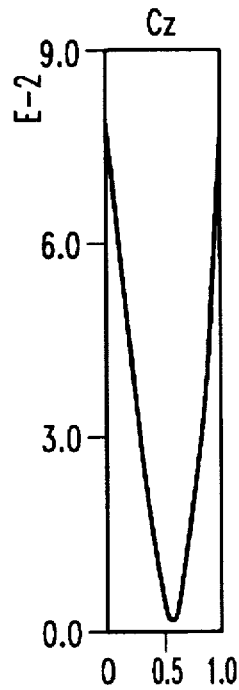
Figure 8A:
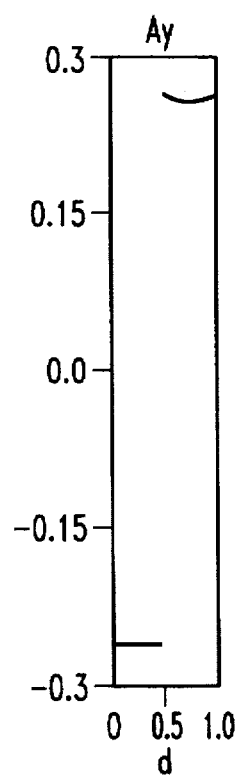
FIGS. 8(A) to 8(D) show the parameters of layer structures of a liquid crystal material according to the first embodiment.
Figure 8B:
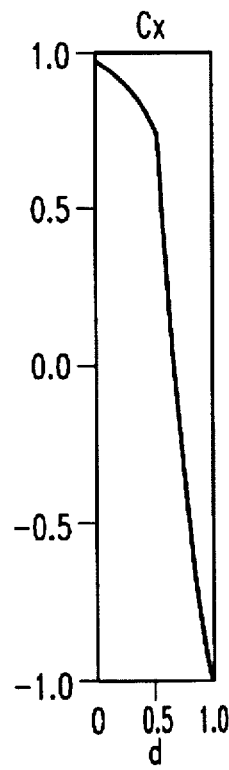
Figure 8C:
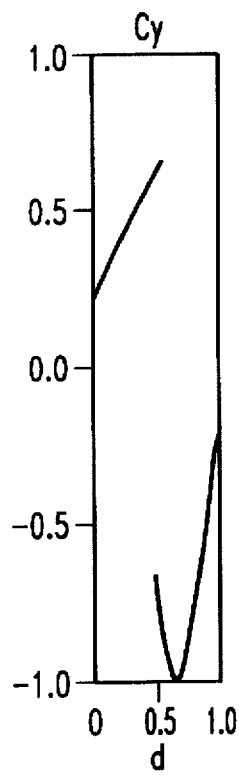
Figure 8D:
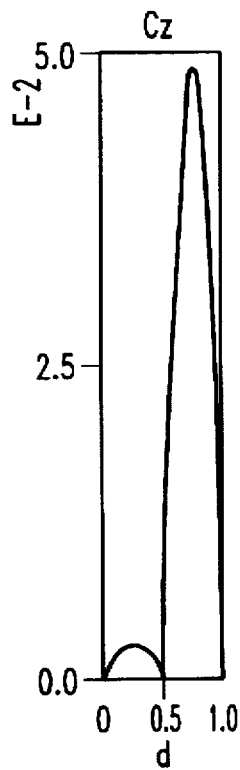
Figure 9A:
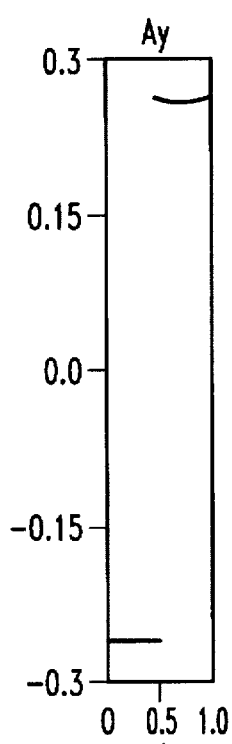
FIGS. 9(A) to 9(D) show the parameters of layer structures of a liquid crystal material according to the first embodiment.
Figure 9B:
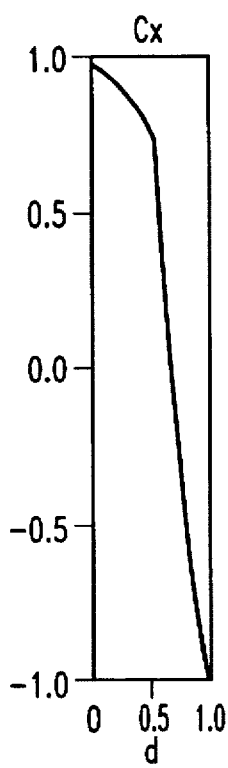
Figure 9C:
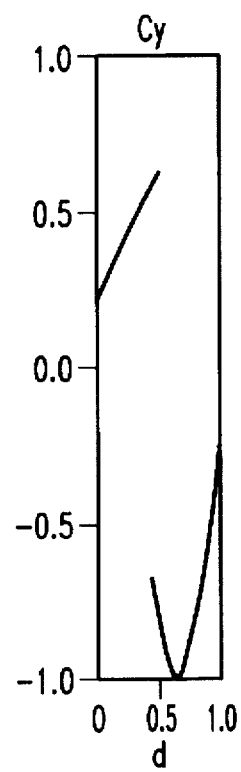
Figure 9D:
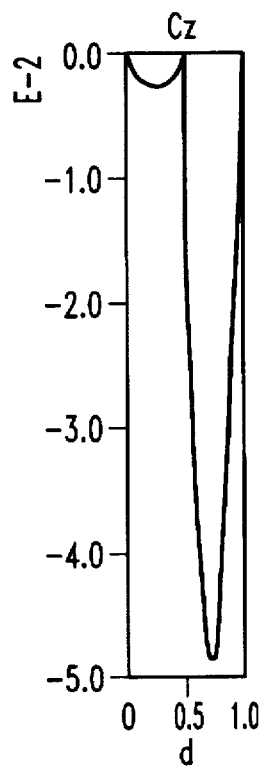
Figure 10A:
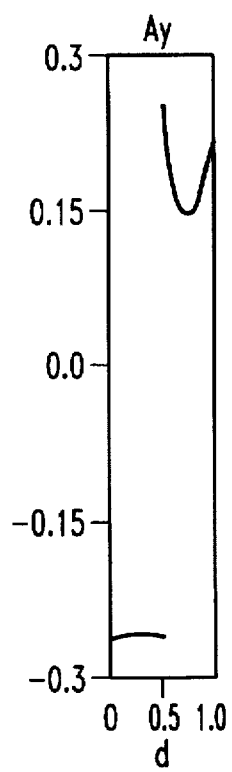
FIGS. 10(A) to 10(D) show the parameters of layer structures of a liquid crystal material according to the first embodiment.
Figure 10B:
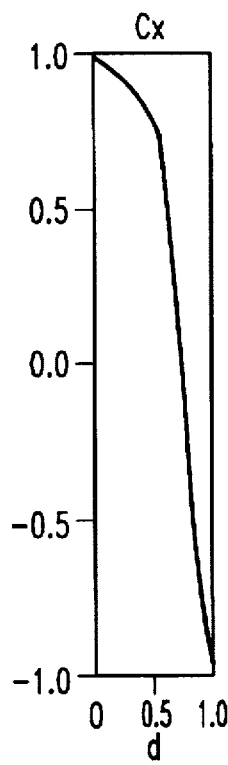
Figure 10C:
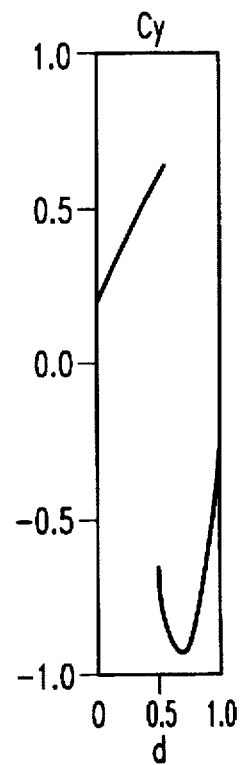
Figure 10D:
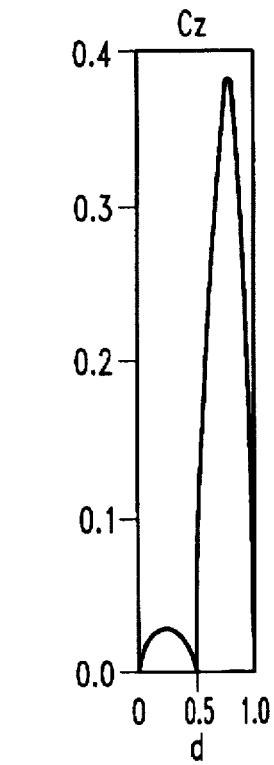
Figure 11A:
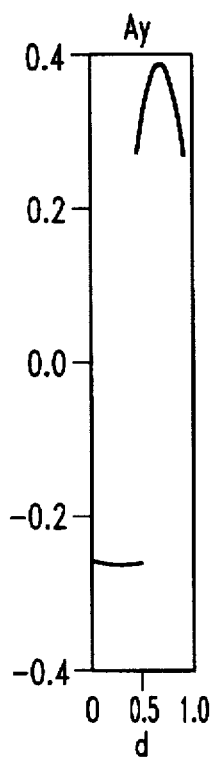
FIGS. 11(A) to 11(D) show the parameters of layer structures of a liquid crystal material according to the first embodiment.
Figure 11B:
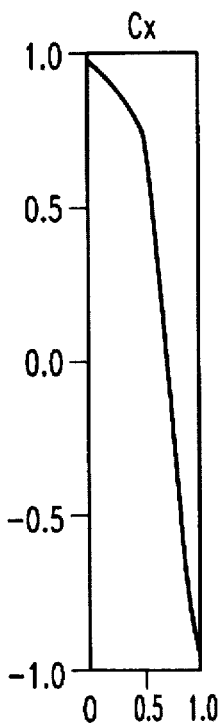
Figure 11C:
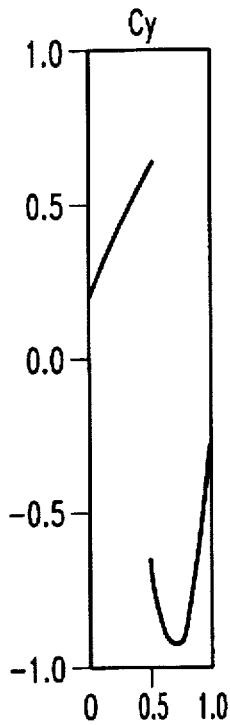
Figure 11D:
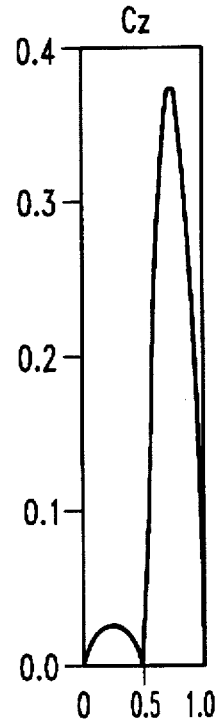
Figure 12A:
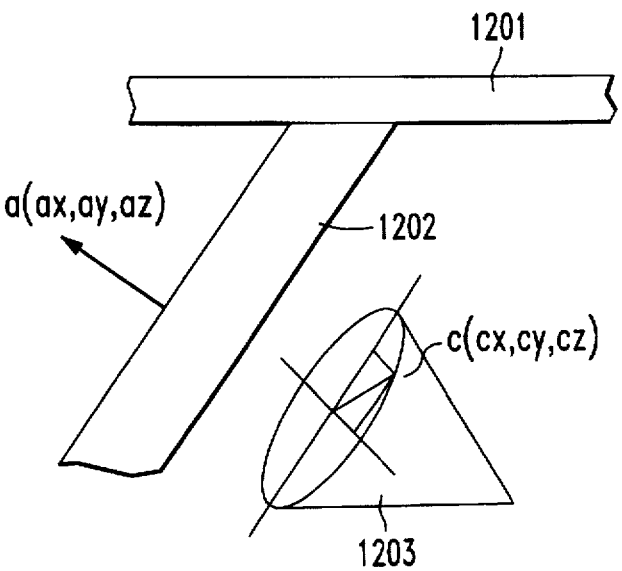
FIGS. 12(A) and 12(B) explain the structure of a cell of a ferroelectric liquid crystal panel according to the present invention.
Figure 12B:
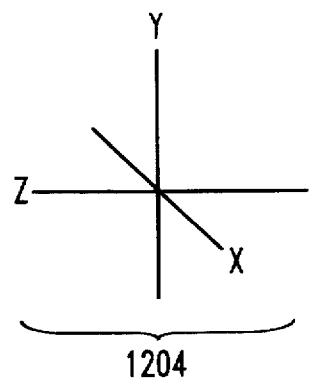
Figure 13:
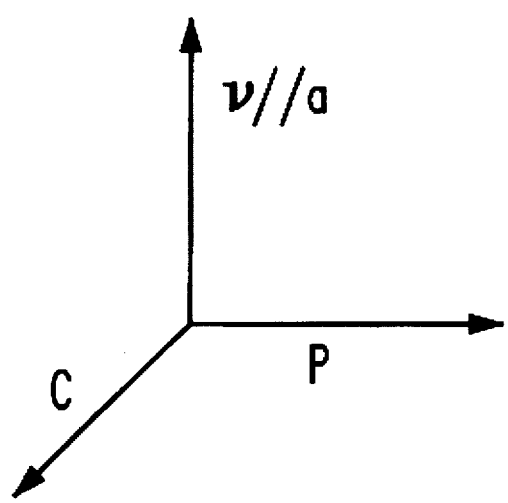
FIG. 13 shows a relationship between spontaneous polarization p and vector parameters in a ferroelectric or antiferroelectric liquid crystal material.

The first embodiment of the present invention will be explained with reference to the drawings. FIG. 12 shows the structure of a ferroelectric liquid crystal panel. An SmC* layer has a cross section 1202 and is held between substrates 1201. The SmC* layer has a normal "a" having a finite value with respect to the substrate 1201. The layer 1202 contains a molecule 1203 whose orientation is defined by a normal a(Ax, Ay, Az) and a molecular direction c(Cx, Cy, Cz). This kind of definition is known as a director notation. This notation employs a coordinate system with axes 1204. The z-axis is substantially equal to an alignment direction. The x-axis is in a plane of the substrate 1201. Free energy F of a liquid crystal in the layer 1202 is expressed as follows (Liquid Crystals 651 (8) 1990 by Nakagawa):

$$F = A/2 * (\nabla \cdot a)^2 + \{(\nabla \cdot c)^2 + (\nabla \times c)^2\} - \tag{1}$$
$$D * c \cdot \nabla \times c + D1 \times v \cdot \nabla \times c -$$
$$C * (\nabla \cdot a) * (\nabla \cdot c) + L/2 * (\kappa - \kappa 0)^2$$

where A, C, D, D1, and L are elastic constants of the layer 1202. The parameters in the expression (1) have the following relationships:

$$\kappa = a \cdot v - 1 \tag{2}$$

$$\kappa 0 = dA/dC^* \tag{3}$$

$$p = v \times c \tag{4}$$

$$a \| v \tag{5}$$

where dA is the thickness of a smectic-A layer, dC* is the thickness of a smectic-C* layer, p is a polarization vector whose relationships with the other vectors a, c, and v are as shown in FIG. 13.

The variables a and c are used to determine various molecular orientations of a given layer, and the expression (1) is used to calculate free energy F of each orientation. Among these orientations, one that provides minimum free energy corresponds to a layer structure provided by the present invention. This layer structure is very stable. According to the present invention, there are several layer structures that provide minimum free energy. The minimum free energy is easily realized in a chevron structure but is hardly realized in a bookshelf structure.

The first embodiment of the present invention carries out arithmetic calculations to design several layer structures that provide minimum free energy. The designed layer structures are formed and tested according to an ATR method. The electro-optical characteristics of panels employing these layer structures are measured. These tests and measurement will be explained below in detail.

To calculate free energy F of each layer structure and find minimum energy, the following standardization is made:

$$Cx^2 + Cy^2 + Cz^2 = 1$$

$$Az = 1$$

When designing a layer structure according to this embodiment, an important factor is a relationship between the orientation of a cone axis determined by Cx, Cy, and Cz and a normal Ay of the layer structure. According to conventional models, the normal Ay is fixed, and therefore, the cone is on a layer surface. On the other hand, a model according to the embodiment is defined by Ay and Cz that are independent finite variables.

Layer structures according to the embodiment will now be explained. These structures are expressed with the above parameters.

FIGS. 1(A) to 1(D) show a layer structure involving a layer normal Ay having a maximal value and a component Cz having a minimal value. An ordinate in the graph of Ay represents tangential values. A value d is a standardized value with a lower substrate being 0 and an upper substrate being 1. Coordinate axes are as shown in FIG. 12. These matters are also applicable to each of the following examples.

FIGS. 2(A) to 2(D) show a layer structure involving a layer normal Ay having a maximal value and a component Cz having two minimal values and a maximal value.

FIGS. 3(A) to 3(D) show a layer structure involving a layer normal Ay having two maximal values and a component Cz having three minimal values and two maximal values. Simultaneously changing the signs of the coordinate axes of the Ay and Cz will not change the generality of the structure.

FIGS. 4(A) to 4(D) show a layer structure involving a layer normal Ay having two maximal values and a minimal value and a component Cz having two maximal values and three minimal values. When the Ay crosses 0, the layer structure causes a kink.

FIGS. 5(A) to 5(D) show a layer structure involving a layer normal Ay having no extreme values and a component Cz having a minimal value.

FIGS. 6(A) to 6(D) show a layer structure that resembles the layer structure of FIG. 5 but is asymmetrical.

FIGS. 7(A) to 7(D) show a layer structure involving a layer normal Ay having two inflection points and a component Cz having a minimal value.

FIGS. 8(A) to 8(D) show a layer structure involving a layer normal Ay having a minimal value on one side and a component Cz having two maximal values.

FIGS. 9(A) to 9(D) show a layer structure involving a layer normal Ay having a minimal value and a component Cz having a minimal value.

FIGS. 10(A) to 10(D) show a layer structure involving a layer normal Ay having a minimal value and a maximal value and a component Cz having two maximal values.

FIGS. 11(A) to 11(D) show a layer structure involving a layer normal Ay having a minimal value and a maximal value and a component Cz having two maximal values. The positions of the minimal and maximal values of the Ay are opposite to those of FIGS. 10(A) to 10(D).

A method of forming the layer structures mentioned above will now be explained. One of the layer structures may be formed alone, or a plurality thereof may be mixed by adjusting the properties of alignment films and by controlling applied voltages. Each alignment film is required to show a contact angle of about 20 to 30 degrees when methyl iodide is used, and about 35 to 45 degrees when pure water is used. It is effective to inactivate OH radicals among molecular radicals exposed from the surface of an alignment film made of PVA or polyimide. A layer structure to be formed is dependent on the contact angles mentioned above.

The layer structures thus formed are evaluated according to the ATR method, which is described in a report prepared by Sambles. This method will be roughly explained below.

A gold or silver absorption film of 300 to 400 angstroms thick is deposited between a glass substrate and an alignment film to form a liquid crystal cell. P-polarized light is made incident to the cell so that an electric-field vector is present in an incident plane of the light. The light is almost entirely reflected by the metal film up to a certain incident angle. When the incident angle exceeds a total-reflection angle defined by a dielectric tensor, the metal film receives or transmits light energy. At this time, the orientations of the metal film, alignment film, and liquid crystal determine a specific profile of reflection strength.

The reflection profile is especially affected by the nature (orientation) of a material just under the metal film. This nature may be studied in detail according to the absolute value of the reflection strength and the reflection angle that causes the reflection strength. Various layer structures were prepared from a ferroelectric liquid crystal material under a variety of conditions and tested according to the ATR method. As a result, the layer structures of FIGS. 1 to 11 were confirmed. One of these structures may be formed alone, or a plurality thereof may be mixed together depending on preparation conditions.

Figure 14A:
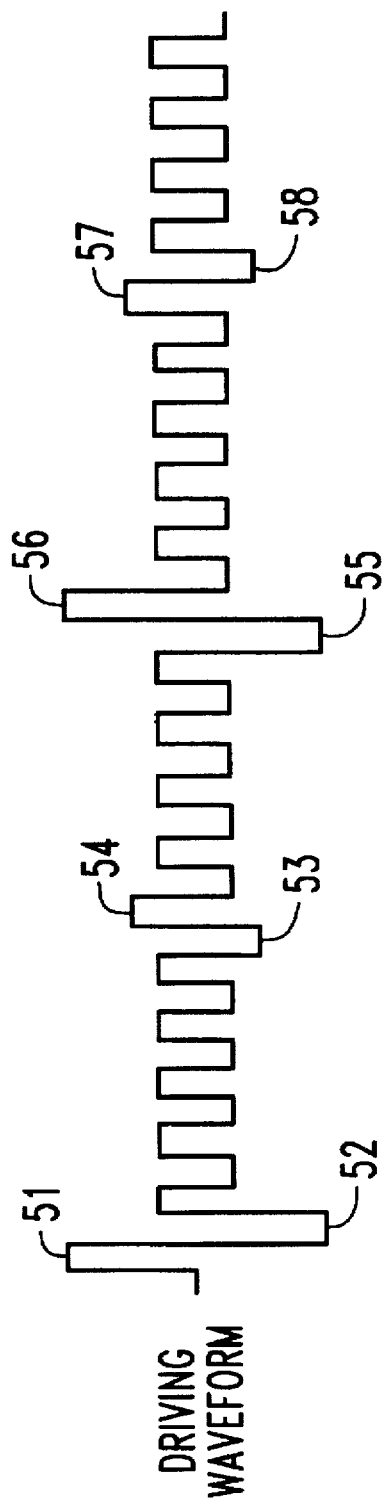
FIGS. 14(A) and 14(B) show the driving waveform and optical characteristics of a ferroelectric liquid crystal panel according to the present invention.
Figure 14B:
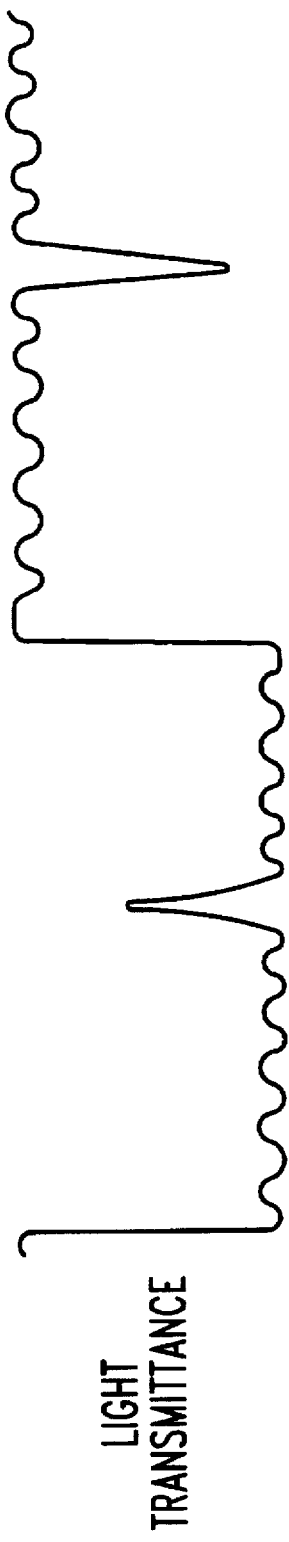

FIGS. 14(A) and 14(B) show results of tests of the memory, response, and durability characteristics of a panel employing a ferroelectric liquid crystal material having the layer structures of the present invention. The layer structures are those of FIGS. 5(A) to 5(D) and 8(A) to 8(D). Inverted voltages 51, 52, 55, and 56 and intermediate voltages 53, 54, 57, and 58 are applied to a cell of the panel. FIG. 14(B) shows changes in the light transmittance of the liquid crystal material in response to these voltages. The liquid crystal material showed an optical bistable characteristic, good reproducibility, good memory function, and fast response. The panel was driven with the same drive waveforms for 30 days, and the same tests were repeated on the panel. The results of the tests were substantially the same as those of the first tests. Accordingly, it is understood that the layer structures of the embodiment are stable against aging. The stability of the layer structures enables the panel to employ a liquid crystal material having higher spontaneous polarization concentration (50 nC/cm$^2$), to improve the memory and response characteristics of the panel. The reason why the embodiment has used a mixture of two layer structures is because it is easier to form the mixture than forming a structure of one kind. Combining the characteristics of several kinds of layer structures may produce a new advantage such as displaying gradations.

Second embodiment

Figure 15A:
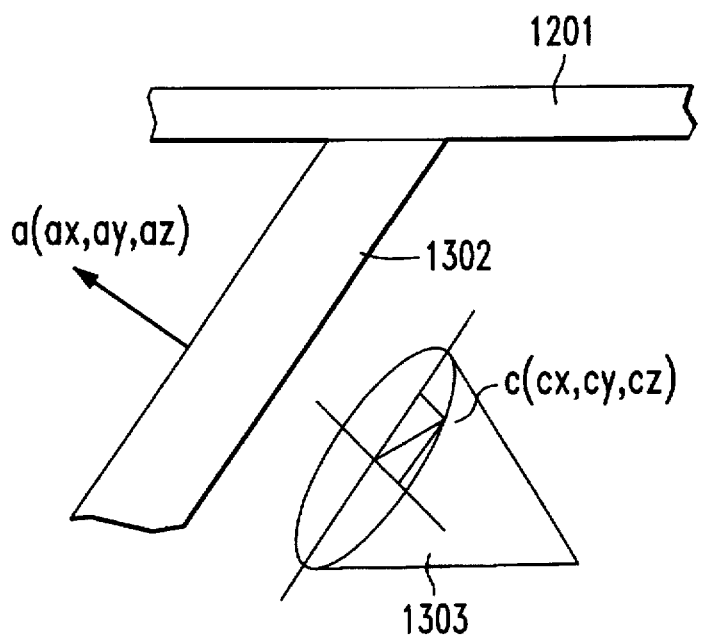
FIGS. 15(A) and 15(B) explain the structure of a cell of an antiferroelectric liquid crystal panel according to the present invention.
Figure 15B:
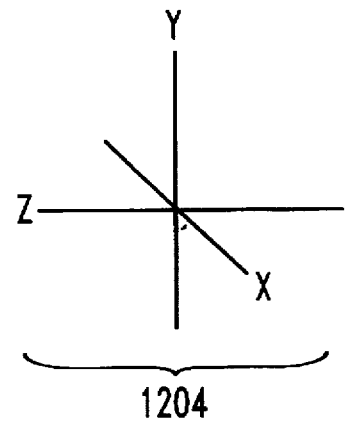

An antiferroelectric liquid crystal panel according to the second embodiment of the present invention will now be explained. FIGS. 15(A) and 15(B) show the panel. An antiferroelectric layer has a cross section 1302 and is held between substrates 1201. The antiferroelectric layer has a normal "a" having a finite value with respect to the substrate 1201. The layer 1302 contains a molecule 1303 whose orientation is defined by a normal a(Ax, Ay, Az) and a molecular direction c(Cx, Cy, Cz). This kind of definition is known as a director notation. This notation employs a coordinate system with axes 1204. The z-axis is substantially equal to an alignment direction. The x-axis is in a plane of the substrate 1201. Free energy F of a liquid crystal in the layer 1302 is expressed as follows (Liquid Crystals 651 (8) 1990 by Nakagawa):

$$F = A_1/2 * (\nabla \cdot a)^2 + \{(\nabla \cdot co)^2 + (\nabla \times co)^2 + \quad (6)$$
$$(\nabla \cdot ce)^2 + (\nabla \times ce)^2\} -$$
$$D2 * co \cdot \nabla \times co + D2 * ce \cdot \nabla \times ce +$$
$$D3 * v \cdot \nabla \times co + D3 * v \cdot \nabla \times ce -$$
$$C1(\nabla \cdot a)\{(\nabla \cdot co) + (\nabla \cdot ce)\} +$$
$$L1/2 (\kappa - \kappa 0)^2 + K$$

where A1, C1, D2, D3, and L1 are elastic constants of the layer 1302, co and ce are c-directors indicating the orientations of molecules of odd and even smectic layers, respectively, in the antiferroelectric liquid crystal material, and K is coupling energy between the odd and even layers. The parameters in the expression (6) have the following relationships:

$$\kappa = a \cdot v - 1 \quad (2)$$
$$\kappa 0 = dA/dC^* \quad (3)$$
$$p = v \times c \quad (4)$$
$$a \| v \quad (5)$$

where dA is the thickness of a smectic A layer, dC* is the thickness of a smectic C* layer, c is any one of the co and ce, p is a polarization vector whose relationships with the other vectors a, c, and v are as shown in FIG. 13 similar to the first embodiment.

The variables a and c (co or ce) are used to determine various molecular orientations of a given layer, and the expression (6) is used to calculate free energy F of each orientation. Among these orientations, one that provides minimum free energy F corresponds to a layer structure provided by the present invention. This layer structure is very stable. According to the present invention, there are several layer structures that provide minimum free energy. Minimum free energy is easily realized in a chevron structure but is hardly realized in a bookshelf structure.

The second embodiment of the present invention carries out arithmetic calculations to design several layer structures that provide minimum free energy. The designed layer structures are formed and tested according to the ATR method. The electro-optical characteristics of panels employing these layer structures are measured.

To calculate free energy F of each layer structure and find minimum energy, the following standardization is made similar to the first embodiment:

$$Cx^2 + Cy^2 + Cz^2 = 1$$
$$Az = 1$$

When designing a layer structure according to this embodiment, an important factor is a relationship between the orientation of a cone axis determined by Cx, Cy, and Cz and a normal Ay of the layer structure. According to conventional models, the normal Ay is fixed, and therefore, the cone is on a layer surface. On the other hand, a model according to the embodiment is defined by Ay and Cz that are independent finite variables.

Layer structures formed according to this embodiment are expressed with like parameters as shown in FIGS. 1 to 11 of the first embodiment. As described in page 537 of Television Association, Vol. 44, No. 5, odd and even smectic layers of an antiferroelectric liquid crystal material contain molecules that are symmetrical to each other with respect to an interface between them. Accordingly, the parameters Cy of the odd and even smectic layers are symmetrical to each other with respect to an x-axis. One of the odd and even smectic layers is the same as any one of the models shown in FIGS. 1 to 11, and the other is not the same but has like extrema.

Figure 16:
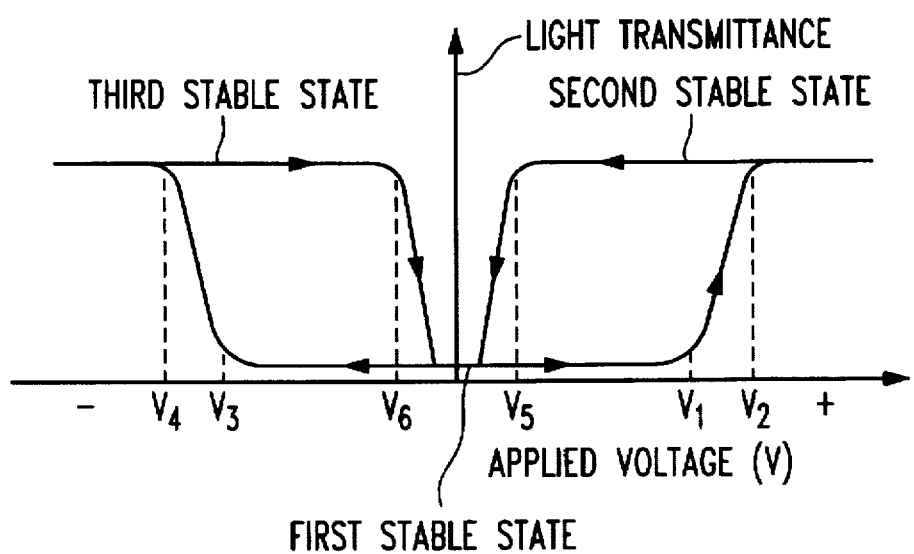
FIG. 16 shows a hysteresis curve indicating the light transmittance of the antiferroelectric liquid crystal panel of the present invention.
Figure 17B:
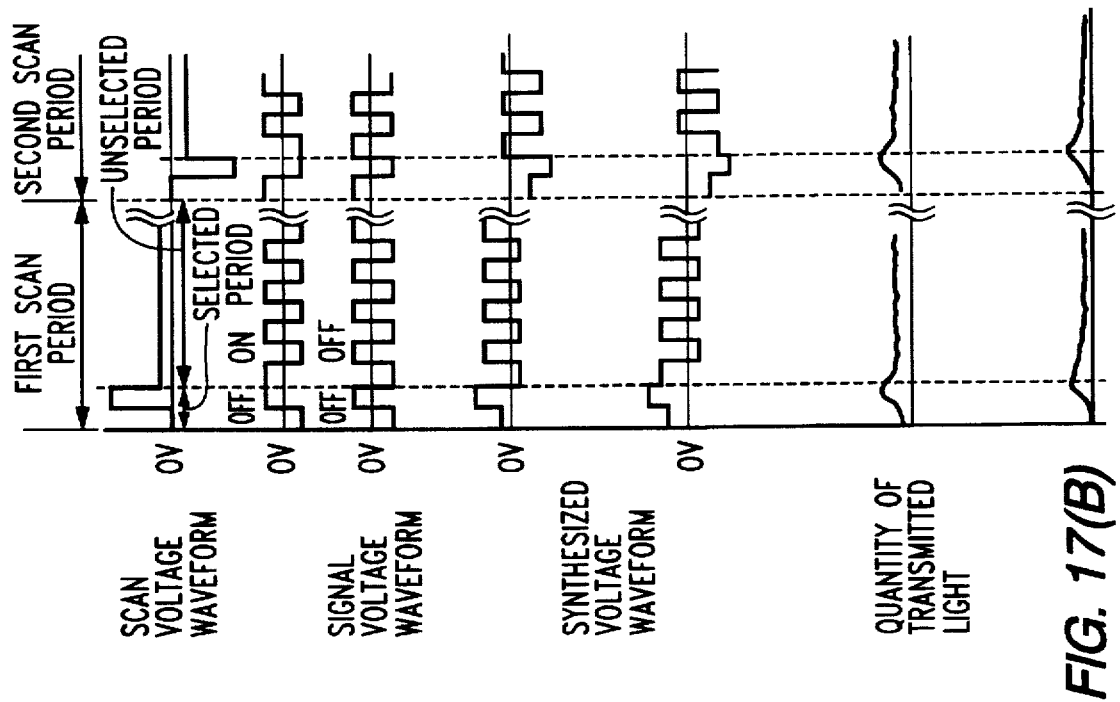
FIGS. 17(A) and 17(B) show a method of driving the antiferroelectric liquid crystal panel of the present invention and the light transmittance of the panel.
Figure 17A:
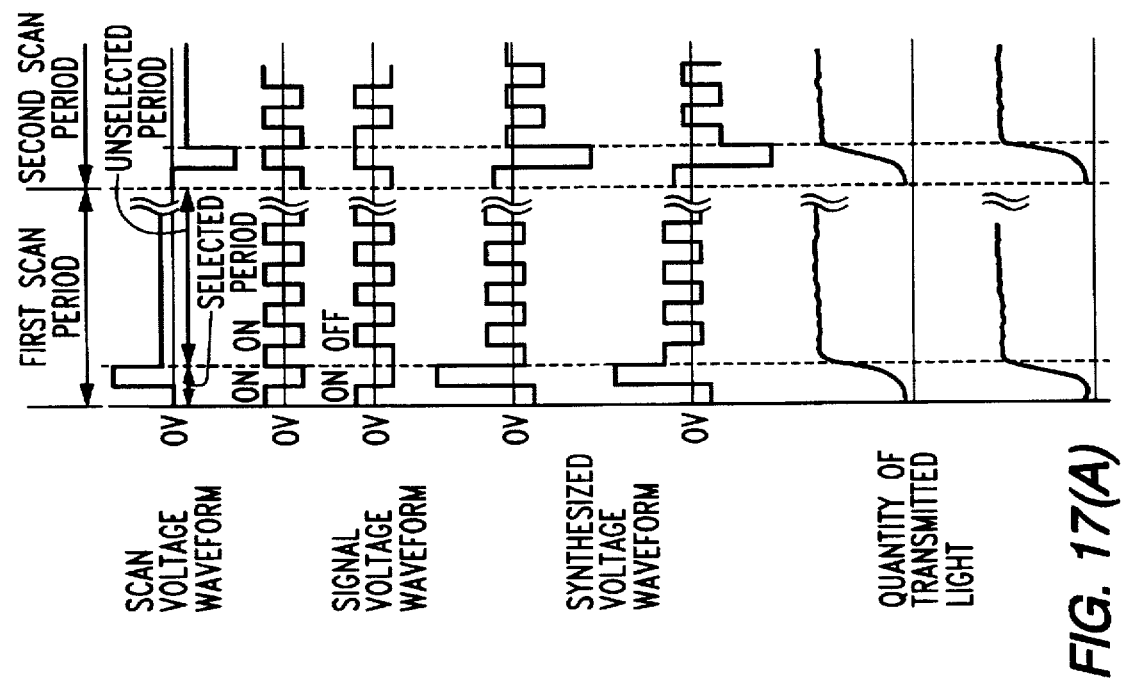

The memory, response, and durability characteristics of a panel employing an antiferroelectric liquid crystal material containing the layer structures of the present invention will be explained according to results of tests. FIG. 16 shows a hysteresis curve indicating the test results. The hysteresis curve represents voltages applied to the liquid crystal panel and corresponding light transmittance of the panel. FIGS. 17(A) and 17(B) show a method of driving the liquid crystal panel and the quantity of transmitted light measured in the tests. The tested liquid crystal material has a mixture of the layer structures of FIGS. 5(A) to 5(D) and 8(A) to 8(D). In FIG. 16, a voltage applied to the panel is increased from zero. When the voltage reaches a value V1, the transmittance of the panel starts to change and is saturated at a value V2. When the voltage is decreased to a value V5, the transmittance of the panel starts to decrease. When the voltage has an opposite polarity and when its absolute value is increased to a value V3, the transmittance of the panel starts to change and is saturated at a value V4. When the absolute value of the voltage is decreased to a value V6, the transmittance of the panel starts to change.

When a pulse wave is applied to the liquid crystal panel and when the absolute value of the product of the width and height of the pulse is above a threshold, the panel is put in a second or third stable state (a ferroelectric state), and when the absolute value of the product is below the threshold, the liquid crystal panel is put in a first stable state (an antiferroelectric state).

Pulses shown in FIGS. 17(A) and 17(B) are applied to the panel. If one of the second and third stable states is set in a selected period and is maintained in the following unselected state, the panel in set to an ON state. If the first stable state is set in the selected period and is maintained in the following unselected period, the panel is set to an OFF state. The ON and OFF states were alternated in the tests.

Through the tests, the liquid crystal material showed three excellent optical stable states, and these states were reproducible. The memory and response characteristics of the liquid crystal material were good. The panel was driven with the same drive waveforms for 30 days, and the same tests were repeated on the panel. The results of the second tests were substantially the same as those of the first tests. Accordingly, it is understood that the panel of the embodiment is stable against aging. The improved stability enables the panel to employ a liquid crystal material having higher spontaneous polarization concentration (250 nC/cm$^2$), to improve the memory and response characteristics of the panel. The reason why the embodiment has used a mixture of two layer structures is because it is easier to form than a structure of one kind. Combining the characteristics of several kinds of layer structures may produce a new advantage such as displaying gradations. In addition to these advantages, the antiferroelectric liquid crystal panel of this embodiment provides a wide view angle and good multiplex characteristics.

As explained above, the present invention provides a ferroelectric or antiferroelectric liquid crystal panel having a plurality of layer structures formed according to a combination of alignment films and electric fields. The panel provides the following effects:

(1) The whole or part of the layer structures in each cell have minimum free energy.

(2) The layer structures, therefore, are stable for a long time of operation.

(3) The liquid crystal cells provide stable memory and response characteristics.

(4) The layer structures reduce burning through a long period of operation and enable the panel to employ a ferroelectric liquid crystal material of 50 nC/cm$^2$ in spontaneous polarization concentration, which is greatly higher than a conventional limit of 10 nC/cm$^2$, or an antiferroelectric liquid crystal material of 250 nC/cm$^2$ in spontaneous polarization concentration, which is greatly higher than a conventional limit of 200 nC/cm$^2$. The present invention, therefore, is effective to fully utilize the fast response of the ferroelectric or antiferroelectric liquid crystal material.

(5) There are a plurality of inflection points in a chevron structure formed in each cell, so that the strength of the panel against stress is higher than the prior art.

I claim:

1. A liquid crystal panel comprising:

two substrates, an electrode film formed on one surface of each of the two substrates, an alignment film formed on each of the electrode films, the two substrates being disposed such that the alignment films face each other, and an antiferroelectric liquid crystal material held between the two substrates, said antiferroelectric liquid crystal material containing a mixture of at least two kinds of layer structures that provide minimum free energy.

2. The liquid crystal panel according to claim 1, wherein a c-director parameter that partly defines one of the at least two kinds of layer structures and is in parallel with the two substrates has at least one minimal value.

3. The liquid crystal panel according to claim 1, wherein a c-director parameter that partly defines one of the at least two kinds of layer structures and is in parallel with the substrates has at least one minimal value.

4. The liquid crystal panel according to claim 1, wherein an a-director parameter that partly defines one of the at least two kinds of layer structures and is orthogonal to the substrates has at least one maximal value.

5. The liquid crystal panel according to claim 1, wherein an a-director parameter that partly defines one of the at least two kinds of layer structures and is orthogonal to the substrates has at least one minimal value.

6. A liquid crystal panel comprising:

two substrates, an electrode film formed on one surface of each of the two substrates, an alignment film formed on each of the electrode films, the two substrates being positioned such that the alignment films face each other, and a ferroelectric liquid crystal material held between said ferroelectric liquid crystal material containing a mixture of at least two kinds of layer structures that provide minimum free energy;

one of the at least two kinds of layer structures being partly defined by a c-director parameter is in parallel with the two substrates and has at least one maximal value.

7. A liquid crystal panel, comprising:

two substrates, an electrode film formed on one surface of each of the two substrates, an alignment film formed on each of the electrode films, the two substrates being positioned such that the alignment films face each other, a ferroelectric liquid crystal material held between the two substrates, said ferroelectric liquid crystal material containing a mixture of at least two kinds of layer structures that provide minimum free-energy;

one of the at least two kinds of layer structures being partly defined by a c-director parameter is in parallel with the two substrates and has at least one minimal value.

8. A liquid crystal panel having two substrates, an electrode film formed on one surface of each of the two substrates, an alignment film formed on each of the electrode films, the two substrates being positioned such that the alignment films face each other, said liquid crystal panel comprising:

a ferroelectric liquid crystal material held between the two substrates, said ferroelectric liquid crystal materials containing a mixture of at least two kinds of layer structures that provide minimum free energy;

one of the layer structures being partly defined by an a-director parameter is orthogonal to the two substrates and has at least one minimal value.

* * * * *

UNITED STATES PATENT AND TRADEMARK OFFICE
CERTIFICATE OF CORRECTION

PATENT NO. : 5,724,116
DATED : March 3, 1998
INVENTOR(S) : Yasushi Suzuki

It is certified that error appears in the above-indentified patent and that said Letters Patent is hereby corrected as shown below:

Claim 6, column 10, line 6, after "between" insert --the two substrates--.

Signed and Sealed this

Fifteenth Day of September, 1998

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,724,116
DATED : March 3, 1998
INVENTOR(S) : Yasushi Suzuki

It is certified that error appears in the above-indentified patent and that said Letters Patent is hereby corrected as shown below:

Column 9, claim 2, line 33, change "minimal" to --maximal".

Signed and Sealed this

Second Day of February, 1999

Attest:

Attesting Officer

Acting Commissioner of Patents and Trademarks